United States Patent [19]

Sassano

[11] 4,391,947

[45] Jul. 5, 1983

[54] LOW VISCOSITY POLYESTER COATING COMPOSITIONS

[75] Inventor: Daniel R. Sassano, Monroeville, Pa.

[73] Assignee: Westinghouse Electric Corp., Pittsburgh, Pa.

[21] Appl. No.: 204,442

[22] Filed: Nov. 6, 1980

[51] Int. Cl.[3] .............................................. C08L 67/06

[52] U.S. Cl. .......................................... 525/11; 525/30

[58] Field of Search .................................... 525/30, 11

[56] References Cited

U.S. PATENT DOCUMENTS

| | | | |
|---|---|---|---|
| 3,533,999 | 10/1970 | Fekete et al. | 260/75 |
| 3,780,133 | 12/1973 | Kolyer et al. | 525/30 |
| 3,784,586 | 1/1974 | Thomas et al. | 525/11 |
| 4,130,520 | 12/1978 | Thomas | 260/29.2 N |

FOREIGN PATENT DOCUMENTS

| | | | |
|---|---|---|---|
| 2044282 | 10/1980 | United Kingdom | 525/11 |

OTHER PUBLICATIONS

Werts, Arthur P., "Use of Additive Combinations in Unsaturated Polyester Formulation", *Annual Technical Conference, Society of Plastics Industry,* New York, N.Y., 1971, pp. Section 4-C, 1-10.

*Chemical Abstracts,* vol. 74, 1971, p. 44, Abstract No. 126,673t, Werts, Arthur P., "Use of Additive Combinations in Unsaturated Polyester Formulation."

*Primary Examiner*—Paul Lieberman
*Assistant Examiner*—Robert E. L. Sellers
*Attorney, Agent, or Firm*—D. P. Cillo

[57] ABSTRACT

A fluid, polyester insulating composition is made by admixing: (A) about 15 mole % to about 40 mole % of unsaturated cyclic dicarboxylic acid; (B) about 5 mole % to about 20 mole % of an unsaturated aliphatic dicarboxylic acid; (C) about 35 mole % to about 60 mole % aliphatic dihydric alcohol; (D) about 25 mole % to 35 mole % copolymerizable monomer; and (E) an active dual inhibiting agent combination of hydroquinone and mono tert butyl hydroquinone, and up to about 10 parts by weight melamine per 100 parts by weight polyester.

6 Claims, No Drawings

LOW VISCOSITY POLYESTER COATING COMPOSITIONS

BACKGROUND OF THE INVENTION

Water based polyester insulating coating compositions, using aromatic and aliphatic dicarboxylic acids, alicyclic dihydric alcohol, and tris (2 hydroxy alkyl) isocyanurate, with methylated melamine formaldehyde and aliphatic amine, are taught by Thomas et al., in U.S. Pat. No. 4,130,520. While these water based insulating compositions eliminated fire and health problems that could be associated with organic solvent based polyesters, there is a need for completely solventless, insulating, thin film coating compositions, that could be used as dipping and vacuum impregnating resins for insulation used in various electrical apparatus.

Fekete et al., in U.S. Pat. No. 3,533,999, teaches solventless polyester casting compositions having good electrical and thermal properties, as replacement for wood, ceramics and rubber in electrical applications. These compositions contain unsaturated dicarboxylic acid and maleic anhydride added to a mixture of ethylene or propylene glycol with neopentyl glycol, and hydroquinone as sole inhibitor, all of which may be diluted with styrene or vinyl toluene. Schroeter et al., in U.S. Pat. No. 3,875,094, teaches UV curable, wax containing, solventless polyester coating compositions having good electrical and hydrolysis properties. These compositions contain a mixture of ethylene or propylene glycol with neopentyl glycol mixed with fumaric acid, and quinone or catechol as sole inhibitor, all of which may be diluted with styrene or vinyl toluene.

While these systems solved various problems in the insulation industry, what is still needed is a polyester system specialized for dipping of random wound coils for electrical apparatus, or vacuum impregnation of form wound coils for electrical apparatus. It is essential that a dipping varnish have long storage stability, since it may be used in 500 to 4,000 gal. quantities in dipping tanks. This specialized varnish should also have a low viscosity, short gel time, good moisture resistance, high flash point, low power factor at elevated temperatures, and provide a good build after a single dip.

SUMMARY OF THE INVENTION

The above need is met by providing a fluid, solventless, dipping and impregnating low viscosity insulating polyester, preferably comprising: about 15 to about 40 mole % of unsaturated cyclic dicarboxylic acid, such as isophathalic acid, or tetrahydrophthalic acid, or their mixtures; about 5 to about 20 mole % of an unsaturated aliphatic dicarboxylic acid such as maleic acid; about 35 to about 60 mole % of a polyhydroxy alcohol, such as an aliphatic dihydric alcohol, preferably neopentyl glycol; 25 to 35 mole % of copolymerizable unsaturated vinyl monomer; and an active, dual inhibiting agent combination consisting of: about 200 to about 300 ppm. hydroquinone combined with about 60 to about 120 ppm. mono tert butyl hydroquinone, along with an effective amount of solubilizer for the inhibitors. From 0 to about 10 parts by weight of a melamine compound can be added to 100 parts by weight of the polyester, to increase bond strength. Small effective amounts of free radical initiator catalysts, such as cobalt naphthenate may also be used, as well as small effective amounts of ultraviolet cure sensitizers. No wax, aliphatic dicarboxylic acid, or alicyclic dihydric alcohol is used.

These coating compositions can be applied by vacuum pressure impregnation or large tank dip methods, onto electrical equipment. They can be cured by heat or, when ultraviolet sensitizers are used, ultraviolet light sources. These resins can be manufactured to give low to medium viscosities; i.e., about 500 to about 1,750 cps. at 25° C., for excellent penetration through at least one layer of mica, or glass fiber, to provide insulating tapes. They possess high polyester to monomer content, long catalyzed as well as uncatalyzed stability at ambient temperatures, short gel time for minimum drainage during bake, high flash points, and excellent electrical, chemical and moisture resistance. They have excellent mechanical strength at elevated temperatures. They also give good film builds after a single dip coating onto electrical conductors, such as copper or aluminum wire or foil, and provide class F-H thermal life.

These coating compositions have the advantage over solvent-based varnishes in that they are totally reactive, theoretically, and easily comply with all of the Environmental Protective Agency requirements for reduction of air pollutants. They have the advantages over water-based varnishes of depositing higher builds at a single dip, and do not give off organic solvents, as used to solubilize the water base resin, or corrosive amines and water during baking.

DESCRIPTION OF THE PREFERRED EMBODIMENTS

In the preferred method of this invention about 2.0 to 4.0 moles of an unsaturated, cyclic dicarboxylic acid are added to about 5 to 6 moles of a polyhydroxy alcohol, such as an aliphatic dihydric alcohol, preferably neopentyl glycol, and about 0 to 2 moles of tris (2 hydroxy alkyl) isocyanurate, where alkyl is from 2 to 6 carbons, in a suitable reaction vessel at a temperature of between about 200° C. and 205° C., until an acid value of 20 is reached. The temperature is then lowered to between about 145° C. and 155° C., and then 0.5 to 2 moles of unsaturated aliphatic dicarboxylic acid is added, after which the temperature is raised to between about 200° C. and 210° C., until an acid value below 25 is reached.

The temperature is then lowered to between about 140° C. and 150° C., and then: 3.5 to 4.5 moles of copolymerizable unsaturated vinyl monomer, an effective amount of free radical initiator catalyst, an effective amount of an active, dual inhibiting combination of 200 to 300 ppm. (parts per million parts of polyester) hydroquinone inhibitor and 60 to 120 ppm. mono tert hydroquinone inhibitor and about 1,500 to 3,000 ppm. solubilizer for the inhibitors, such as triethyl phosphate, triphenyl phosphate, and the like, are added to the mixture in the reaction vessel. An effective amount of a melamine compound may also be added at this point as a cross-linking agent. The addition of melamine can dramatically increase bond strength. One part of free radical initiator catalyst is then added to 100 parts of this reaction admixture, to provide a solventless, low viscosity polyester, dipping and impregnating composition. The viscosity of the composition will range from about 500 to 1,750 cps. at 25° C. Optionally, about 2 to 6 pph. (parts per hundred parts of polyester) of ultraviolet radiation sensitive photoinitiator can also be added to the catalyzed resin.

Useful, unsaturated, cyclic dicarboxylic acids, added in the range of between about 15 mole % to about 40 mole %, are: isophthalic aromatic dicarboxylic acid, tetrahydrophthalic acid and endo methylene tetrahydrophthalic acid, their anhydrides and their mixtures. Preferably, both isophthalic and tetrahydrophthalic will be used. Phthalic acid is excluded since it tends to lower mechanical strength of the cured composition at high temperatures.

The polyhydroxy alcohol, usually an aliphatic dihydric alcohol, added in the range of between about 35 mole % to about 60 mole %, is preferably neopentyl glycol. Ethylene glycol, propylene glycol, 1,3-propane diol, glycerine and the like tend to lower the thermal stability of the composition; however, these compounds may be useful in this invention, in the ranges set forth above, where extreme heat stability is not required. The neopentyl glycol can be solubilized with minor effective amounts of water, about 0.05 to 0.15 gram/1 gram neopentyl glycol, to allow use of lower mixing temperatures. The term "neopentyl glycol" is herein meant to include such minor amounts of water. From 0 mole % to about 20 mole % of tris (2 hydroxyalkyl) isocyanurate, where alkyl is from 2 to 6 carbon atoms, particularly tris (2 hydroxy ethyl) isocyanurate, can optionally be used to help cross-linking during the esterification reaction.

Useful unsaturated aliphatic dicarboxylic acids, added in the range of between about 5 mole % to about 20 mole % are: maleic acid and fumaric acid, their anhydrides and their mixtures. Use of over 20 mole % of this material provides a polyester which is very highly cross-linked, lowering storage stability. Vinyl toluene is a useful, much preferred copolymerizable unsaturated vinyl monomer for the formulation of this invention. Dicyclopentadiene acrylate can also be useful. Other monomers, such as styrene will generally lower the flash point and increase the vapor pressure of the composition. The mole % range of between 25 mole % to 35 mole % monomer is critical. Above or below this range in the composition of this invention will result in poor film formation and/or poor impregnation. Under 25 mole %, results in poor component reaction. Over 35 mole % tends to cause film shrinkage.

It is critical that an active, dual inhibiting combination of only 200 to 300 ppm. hydroquinone and 60 to 120 ppm. mono tert butyl hydroquinone be used. This combination alone, in the amounts set forth above, gives essential long catalyzed storage life to the dipping composition of this invention, while still maintaining fast gellation times for minimum drainage during cure. This inhibitor combination is "active" in the sense that it promotes fast gellation of the composition at curing temperatures. Hydroquinone, mono tert butyl hydroquinone and para benzoquinone alone, and combinations of para benzoquinone plus hydroquinone or tert butyl catechol plus hydroquinone are not effective in this critical function.

The inhibitor combination of this invention is a unique system for preventing gellation of large quantities of unsaturated polyester resin formed from an unsaturated polybasic acid and a polyhydroxy alcohol. The polybasic acid can be a cyclic polycarboxylic acid, or an aliphatic polycarboxylic acid such as maleic acid, or their mixtures, including their corresponding anhydrides. With the inhibitors, an amount of solubilizer effective to allow solubilization into the other components is necessary. Useful solubilizers include triethyl phosphate, triphenyl phosphate, dioctyl phthalate and the like, as are well known in the art.

A melamine formaldehyde compound, such as hexamethoxy methyl melamine, in the range of between 0 to about 10 parts by weight, preferably 5 to 8 parts by weight, per 100 parts by weight of polyester, can be added to improve both room temperature and hot bond strength after cure.

Useful free radical initiator catalysts include effective amounts of cobalt naphthenate, dicumyl peroxide, and the like, as are well known in the art. These initiators also act to eliminate any tack problems in the cured composition. Useful, optional ultraviolet radiation sensitive photoinitiators, well known in the art, would include, for example, effective amounts of benzophenone; diethoxy-acetophenone, benzoin methyl ether; benzoin ethyl ether; benzoin isopropyl ether; benzoin isobutyl ether; diethoxy-xanthanone; chlorothio-xanthanone; azo-bis-isobutyronitrile; N-methyl diethanolamine-benzophenone, mixtures thereof, and the like, as are well known in the art.

EXAMPLE 1

A fluid, low viscosity polyester dipping and impregnating insulating composition was made by admixing the following ingredients, as described below:

| | Wt. % | Moles | Mole % | ppm. |
|---|---|---|---|---|
| 1. Tetrahydrophthalic anhydride | 18.208 | 0.1198 | 14.39 | |
| 1'. Isophthalic acid | 11.488 | 0.0692 | 8.32 | |
| 2. Neopentyl glycol | 33.773 | 0.3247 | 39.00 | |
| 3. Maleic anhydride | 6.805 | 0.0694 | 8.33 | |
| 4. Hydroquinone | 0.028 | | | 280 |
| 5. Mono tert butyl hydroquinone | 0.009 | | | 90 |
| 6. Triethyl phosphate | 0.226 | | | |
| 7. Vinyl toluene | 29.434 | 0.2494 | 29.96 | |
| 8. Cobalt Naphthenate | 0.032 | | | |

Ingredients 1, 1', 2 and 3 were charged into a kettle and reacted at 200° C. to 205° C. until an acid value of 20 was reached. The temperature of the mixture was lowered to 150° C. and ingredient 4 was added. The temperature of the mixture was then raised to 200° C. to 210° C. until the acid value dropped to 24. The temperature was then lowered to 145° C. and ingredients 5, 6, 7 and finally 8 were added. The admixture was then cooled to 25° C. To 100 parts by weight of this polyester admixture was added 1 part by weight of dicumyl peroxide at 25° C., to provide a solventless polyester insulating composition having the following properties:

Polyester Solids: 68%
Viscosity at 25° C.: 1,030 cps.
Specific Gravity at 25° C.: 1.075
Flash Point: 60° C.
Catalyzed Storage Life: 1 year+

This composition was poured into aluminum foil sample dishes, deposited on ¼ inch helical copper coils, and dip coated onto copper wire. In all cases the samples were quickly gelled and then cured for 4 hours at 150° C. The following properties were measured:

Power Factor at 25° C.: 4.6%
Power Factor at 155° C.: 5.5%
Dielectric Strength (volts/mil): 1900
Insulation Resist (500 r): $10^6$ Meg ohm
Film Build/Dip On Wire: 1.75 mils
Bond Strength On Wire at 25° C.: 25 lb. for 1.75 mil build
Bond Strength On Wire at 100° C.: 3 lb. for 1.75 mil build The composition was also dip over coated onto polyamide-imide insulated copper wire. The thermal rating of the polyester overcoat was measured to be Class F.

As can be seen, the polyester of this invention has outstanding physical and electrical properties, an outstanding pot life, good single build thicknesses, high flash point and low viscosity. It was found to easily penetrate single or plural layers of cloth-backed mica tape and fibrous glass tape, to provide resin impregnated electrical winding insulation tapes. It was also successfully used as an insulating dip for random wound motor and generator stator coils and as a vacuum impregnation composition for stators coils of form wound motors and generators.

EXAMPLE 2

A fluid, low viscosity polyester dipping and impregnating insulation composition was made, using the same amounts of the same ingredients and using the same method as in EXAMPLE 1, using a 4 hour cure at 150° C., except that for each 100 parts by weight of the polyester admixture, 1 part by weight of dicumyl peroxide and about 8 parts by weight, of hexamethoxy methyl melamine was added at 25° C. This provided a solventless polyester insulating composition having essentially the same properties as the composition of EXAMPLE 1, except that bond strength was improved as shown below:

Bond Strength on Wire at 25° C.*: 56.8 lb. for 1.75 mil build

Bond Strength on Wire at 100° C.*: 11.5 lb. for 1.75 mil build

As can be seen, the addition of an effective amount of melamine can increase room temperature bond strength by 100% and hot bond strength by over 200%. Similarly to EXAMPLE 1, this composition was an outstanding dipping and impregnating insulating polyester for electrical conductors and electrical coils.

EXAMPLE 3

A fluid, low viscosity polyester dipping and impregnating insulation composition was made, using the same amounts of the same ingredients and using the same method as in EXAMPLE 1, except that for each 100 parts by weight of the polyester admixture, 4 parts by weight of benzoin ether photoinitiator was added. This provided a solventless polyester insulating composition having essentially the same properties as the composition of EXAMPLE 1, except that it was cured as a tack free, 1.5 mil thick film, under medium pressure mercury ultraviolet lamps, after about 10 to 15 seconds exposure.

This formulation has the ability to form a skin to diminish coil draining after resin dipping, after which it can be further heated to completely cure the resin. This formulation may also be used to provide deep section cures of coating resins on a variety of conducting substrates. Additionally, the time under the lamps can be adjusted to provide tacky adhesive tape materials, which could be useful for a variety of applications.

I claim:

1. A fluid, thermally stable, solventless, insulating composition, useful as a dipping and impregnating resin, consisting essentially of:

(1) 100 parts by weight of a polyester composition consisting of the admixture of:

(A) about 15 mole % to about 40 mole % of unsaturated cyclic dicarboxylic acid selected from the group consisting of isophthalic acid, tetrahydrophthalic acid, endo methylene tetrahydrophthalic acid, their anhydrides and their mixtures;

(B) 5 mole % to 20 mole % of an unsaturated aliphatic dicarboxylic acid;

(C) about 35 mole % to about 60 mole % of neopentyl glycol as sole aliphatic dihydric alcohol;

(D) 25 mole % to 35 mole % of copolymerizable unsaturated vinyl monomer;

(E) from 0 mole % to about 20 mole % of tris (2 hydroxy alkyl) isocyanurate, where alkyl is from 2 to 6 carbon atoms; and (F) an active, dual inhibiting agent combination consisting of:

(i) 200 ppm. to 300 ppm. hydroquinone, and (ii) 60 ppm. to 120 ppm. mono tert butyl hydroquinone and including an effective amount of solubilizer for the inhibiting combination; said polyester composition having a viscosity of from about 500 cps. to about 1,750 cps. at 25° C.; and (2) from 0 parts to about 10 parts by weight of a melamine-formaldehyde compound.

2. The composition of claim 1, where the melamine-formaldehyde compound is hexamethoxy methyl melamine.

3. The composition of claim 1, also containing an effective amount of free radical initiator catalyst selected from the group consisting of cobalt naphthenate and dicumyl peroxide.

4. The composition of claim 1, also containing an effective amount of ultraviolet cure sensitizer.

5. The composition of claim 1, where the unsaturated aliphatic dicarboxylic acid is selected from the group consisting of maleic acid, fumaric acid, their anhydrides and their mixtures, the copolymerizable unsaturated vinyl monomer is selected from the group consisting of vinyl toluene and dicyclopentadiene acrylate, and the solubilizer for the dual inhibiting combination is selected from the group consisting of triethyl phosphate, triphenyl phosphate, and dioctyl phthalate.

6. The composition of claim 1, containing 5 parts by weight to 8 parts by weight of melamine-formaldehyde compound per 100 parts by weight of polyester.

* * * * *